(12) United States Patent
Wandera et al.

(10) Patent No.: US 11,894,517 B2
(45) Date of Patent: Feb. 6, 2024

(54) ACID STRATIFICATION MITIGATION, ELECTROLYTES, DEVICES, AND METHODS RELATED THERETO

(71) Applicant: AMTEK RESEARCH INTERNATIONAL LLC, Lebanon, OR (US)

(72) Inventors: Daniel Wandera, Corvallis, OR (US); Robert Waterhouse, Lebanon, OR (US); Wyatt Self, Albany, OR (US); Eric B. Hostetler, Corvallis, OR (US); Richard W. Pekala, Corvallis, OR (US)

(73) Assignee: Amtek Research International LLC, Lebanon, OR (US)

( * ) Notice: Subject to any disclaimer, the term of this patent is extended or adjusted under 35 U.S.C. 154(b) by 90 days.

(21) Appl. No.: 17/093,470

(22) Filed: Nov. 9, 2020

(65) Prior Publication Data

US 2021/0265660 A1  Aug. 26, 2021

Related U.S. Application Data

(63) Continuation of application No. PCT/US2019/031630, filed on May 9, 2019.

(60) Provisional application No. 62/726,856, filed on Sep. 4, 2018, provisional application No. 62/726,854, filed on Sep. 4, 2018, provisional application No. 62/669,076, filed on May 9, 2018, provisional application No. 62/669,090, filed on May 9, 2018.

(51) Int. Cl.

| *H01M 10/0565* | (2010.01) |
| *H01M 50/417* | (2021.01) |
| *H01M 50/446* | (2021.01) |
| *H01M 10/0567* | (2010.01) |
| *H01M 10/0569* | (2010.01) |
| *H01M 50/449* | (2021.01) |
| *H01M 50/414* | (2021.01) |
| *H01M 50/42* | (2021.01) |
| *H01M 50/423* | (2021.01) |
| *H01M 50/457* | (2021.01) |
| *H01M 50/491* | (2021.01) |

(52) U.S. Cl.
CPC ... *H01M 10/0565* (2013.01); *H01M 10/0567* (2013.01); *H01M 10/0569* (2013.01); *H01M 50/414* (2021.01); *H01M 50/417* (2021.01); *H01M 50/42* (2021.01); *H01M 50/423* (2021.01); *H01M 50/446* (2021.01); *H01M 50/449* (2021.01); *H01M 50/457* (2021.01); *H01M 50/491* (2021.01); *H01M 2300/0011* (2013.01); *H01M 2300/0091* (2013.01)

(58) Field of Classification Search
CPC .......... H01M 10/0565; H01M 50/417; H01M 50/446; H01M 10/0567; H01M 10/0569; H01M 2300/0011; H01M 2300/0091; H01M 50/449; H01M 50/414; H01M 50/42; H01M 50/423; H01M 50/457; H01M 50/491

See application file for complete search history.

(56) References Cited

U.S. PATENT DOCUMENTS

| 4,425,192 A * | 1/1984 | McKinley ............... H01M 4/22 |
| | | 204/229.5 |
| 5,096,787 A | 3/1992 | Delaney et al. |
| 5,665,484 A | 9/1997 | Bolger |
| 7,538,517 B2 | 5/2009 | Alvarez-Troncoso et al. |
| 8,586,220 B2 | 11/2013 | Koch et al. |
| 9,379,378 B2 | 6/2016 | Ross et al. |
| 2004/0197650 A1* | 10/2004 | Kubota ............. H01M 10/0565 |
| | | 429/316 |
| 2005/0069762 A1* | 3/2005 | Daley ................. H01M 50/256 |
| | | 429/179 |
| 2013/0202949 A1 | 8/2013 | Bremer et al. |
| 2016/0028060 A1 | 1/2016 | Pekala et al. |
| 2016/0030110 A1 | 2/2016 | Wang et al. |
| 2016/0141720 A1* | 5/2016 | Onozaki ........... H01M 10/0567 |
| | | 429/327 |
| 2016/0263032 A1* | 9/2016 | Grassano .................. B02C 7/17 |
| 2016/0289439 A1* | 10/2016 | Nagasawa ............ C09D 127/16 |
| 2016/0359172 A1* | 12/2016 | Zhu ....................... H01M 4/925 |
| 2017/0077479 A1 | 3/2017 | Miller et al. |
| 2017/0101514 A1* | 4/2017 | Ishihara ................ C08F 279/02 |
| 2017/0365884 A1* | 12/2017 | Ihara ................. H01M 10/0567 |

(Continued)

FOREIGN PATENT DOCUMENTS

| EP | 2731176 B1 | 2/2017 |
| WO | 2019217759 A1 | 11/2019 |

OTHER PUBLICATIONS

International Search Report and Written Opinion dated Jul. 17, 2019 received in PCT/US2019/031630.

(Continued)

*Primary Examiner* — Sarah A. Slifka
(74) *Attorney, Agent, or Firm* — Dorsey & Whitney LLP

(57) ABSTRACT

Methods of reducing acid stratification with an acid-soluble and acid-stable polymer with a high molecular weight are disclosed herein. Electrolytes and separators for an energy storage device are disclosed herein. The separator includes a coating containing an acid-soluble and acid-stable polymer with a high molecular weight. The electrolyte includes sulfuric acid and an acid-soluble and acid-stable polymer with a high molecular weight. Methods of making the separators disclosed herein and methods of making batteries are also disclosed herein.

20 Claims, 12 Drawing Sheets

(56) References Cited

U.S. PATENT DOCUMENTS

2018/0048014 A1 2/2018 Sugimori et al.
2018/0069221 A1 3/2018 Takahashi et al.

OTHER PUBLICATIONS

Waterhouse, Robert, "Acid Stratification in Flooded Lead Acid Batteries", RW 090310 Acid Stratification, Mar. 11, 2009, 7 pages.

* cited by examiner

ACID STRATIFICATION MITIGATION, ELECTROLYTES, DEVICES, AND METHODS RELATED THERETO

CROSS-REFERENCE TO RELATED APPLICATIONS

This patent application is a continuation of International Patent Application No. PCT/US2019/031630, filed May 9, 2019, which in turn claims priority to U.S. Provisional Application No. 62/669,090, titled "ACID STRATIFICATION MITIGATION, DEVICES AND METHODS RELATED THERETO," and filed May 9, 2018; U.S. Provisional Application No. 62/669,076, titled "ACID STRATIFICATION MITIGATION, ELECTROLYTES, DEVICES, AND METHODS RELATED THERETO," and filed May 9, 2018; U.S. Provisional Application No. 62/726,854, titled "ACID STRATIFICATION MITIGATION, DEVICES AND METHODS RELATED THERETO," and filed Sep. 4, 2018; U.S. Provisional Application No. 62/726,856, titled "ACID STRATIFICATION MITIGATION, ELECTROLYTES, DEVICES, AND METHODS RELATED THERETO," and filed Sep. 4, 2018; the entire contents of each of which are hereby incorporated herein by reference.

COPYRIGHT NOTICE

© 2020 Amtek Research International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to electrolytes and separators for reducing acid stratification in flooded lead acid batteries.

BACKGROUND INFORMATION

Enhanced flooded batteries (EFB) have been developed to meet the high cycling requirements in "start-stop" or "micro-hybrid" vehicle applications. In such applications, the engine is shut off while the vehicle is stopped (e.g., at a traffic light) and then re-started afterwards. The advantage of a "start-stop" vehicle design is that it results in reduced CO2 emissions and better overall fuel efficiency. A major challenge in "start-stop" vehicles is that the battery must continue to supply all electrical functions during the stopped phase while being able to supply sufficient current to re-start the engine at the required moment. In such cases, the battery must exhibit higher performance with respect to cycling and recharge capability as compared to a traditional flooded lead-acid battery design. In such cases, the battery operates in a partial-state-of-charge (PSOC). PSOC operation results in acid stratification and contributes to shorter cycle and calendar life in flooded batteries.

Acid stratification occurs as a result of the participation of the sulfuric acid electrolyte in the charge and discharge reactions of the battery. These reactions are shown below. During discharge, the reactions proceed from left to right; and, during charge, they proceed from right to left.

Positive electrode: $PbO_2 + H_2SO_4 + 2H^+ + 2e^- \leftrightarrow PbSO_4 + 2H_2O$ Negative electrode: $Pb + H_2SO_4 \leftrightarrow PbSO_4 + 2H^+ + 2e^-$ During discharge, sulfuric acid is consumed at both electrodes and water is produced at the positive electrode. This results in a dilution of the acid next to the electrode. The dilute acid has a lower density (FIG. 1), and this creates a driving force for natural convection; the lower density acid next to the electrodes rises and the higher density acid, in the middle of the space between the two electrodes, sinks (FIG. 2).

At higher discharge rates, the gradient in density from the electrode to the bulk will be greater than that at low discharge rates, where diffusion from the bulk is fast enough to replace the acid that is consumed at the electrodes and for water produced at the positive electrode to move to the bulk. The density gradient is also increased at lower temperatures, when diffusion is slowed down, as described generically by the Nernst-Einstein equation for the diffusion of a single solute molecule of A through a stationary medium B (see also FIG. 3):

$$D_{AB} = kT(u_A/F_A).$$

During charge, the process is reversed and acid is generated at both electrodes. This will have the effect of reversing the density gradient between the electrodes so that the acid is denser at the electrode surface and less dense in the bulk between the electrodes. This will be true particularly if there has been a rest period between discharge and charge. The convective flow will also be reversed: the denser acid next to the electrodes will sink, and the lower density acid in the bulk will rise.

Another contributor to acid stratification is non-uniform current distribution on the electrode (3). Due to the electrical resistance to current flow through the electrode grid and active material, the current density will be higher at the top of the electrode, near the strap, than at the bottom of the electrode. The higher current density at the top will result in a higher rate of acid depletion at the top of the electrode than that at the bottom of the electrode. This effect will be exacerbated by high rate discharge, such as that which occurs during the starting of the engine.

The net effect of the convective flows and non-uniform current distribution is that the acid becomes gradually less dense at the top of the cell and denser at the bottom of the cell. This is the phenomenon referred to as acid stratification and it will proceed until some sort of mixing occurs. Mixing is generally provided during overcharge of the battery, when both electrodes evolve gas, oxygen at the positive electrode and hydrogen at the negative electrode, as shown in the reaction equations below:

Positive electrode overcharge: $H_2O \rightarrow 2H^+ + \frac{1}{2}O_2\uparrow + 2e^-$ Negative electrode overcharge: $2H^+ + 2e^- \rightarrow H_2\uparrow$.

The bubbles of gas mix up the electrolyte as they rise, reducing or eliminating the stratification. When batteries operate in a partial state of charge for long periods of time, as occurs in hybrid automobiles, there is less gas generation and expected occurrence of a high degree of stratification.

Acid stratification and the acid convection that causes it are not hypothetical conditions; their effects have been measured in the laboratory and modeled for application to real battery systems. FIGS. 4A-C depict actual convection velocity gradients in a model battery system (no separator)

during recharge (current density 9.434 mA/cm²; x=2.0 mm denotes the boundary between PbO² electrode and reservoir, while x=4.0 mm stands for the boundary between reservoir and Pb electrode) (5). The velocity field was measured by Doppler velocimetry (4). Also depicted are predictions of a model of these effects (5).

Both the measurements and the model show that the denser acid formed at the surfaces of the electrodes, and particularly the positive electrode, results in a downward flow at the electrodes. This is accompanied by an upward flow of the less dense electrolyte in the center between the electrodes. FIG. 5 illustrates the concentration profile that develops from the top of the cell to the bottom as a result of these acid flows (5).

Since the acid, $H_2SO_4$, is one of the reactants in the battery, the voltage of the battery will depend on the concentration of the acid according to the Nernst equation. For the lead-acid battery, the Nernst equation can be written as (6):

$$V_0 = 2.048 + (RT)/(2F) \log[(4f_\pm^3 c^3_{H2SO4})/a^2_{H2O}],$$

where R is the universal gas constant, T the absolute temperature, F the Faraday constant, $f_\pm$ the mean activity coefficient of sulfuric acid, $C_{H2SO4}$ acid concentration, and $a_{H2O}$ the activity of water. This results in an increase in cell voltage as the acid concentration increases. A more convenient linear approximation for the cell potential is (6):

$$V_0 = 0.84 + \rho,$$

where $\rho$ is the density of the electrolyte in g/cm³. From this simple equation, it can be seen that a small change in density, of 0.010 g/cm³, will result in a change in potential of 10 mV. Thus, when the electrolyte becomes stratified, the local potential of the electrode varies as a function of position as the concentration and density of the electrolyte increase from top to bottom.

The variation in potential can result in local concentration cells that redistribute the charge on each electrode during open circuit when the electrodes are at a partial state of charge. The actions of the local concentration cells at the positive and negative electrodes are illustrated in FIG. 6. Since the driving force for the concentration cells is the difference in acid concentration, the cells will react in a way to lessen the driving force. This results in discharging of the lower portion of each electrode to consume some acid and charging of the upper portion of each electrode to produce some acid. Because the voltage differences are small, the currents flowing are also small. Such a low rate discharge at the lower portion of the negative can, for a long open circuit time, result in the formation of large crystals of lead sulfate (4,7) that cannot be recharged, a condition known as sulfation.

The preceding discussion has treated the interactions of electrolyte and electrodes in the absence of the separator. The separator can affect acid stratification. There continues to be a need for technologies that reduce acid stratification.

SUMMARY OF THE DISCLOSURE

It has been discovered that introducing an acid-soluble and acid-stable polymer with a high molecular weight into the electrolyte of a battery can be used to reduce acid stratification during use of the battery, such as in lead-acid batteries, particularly enhanced flooded lead-acid batteries. Without wishing to be bound by theory, it is believed that the high molecular weight polymer solubilizes in the acid that serves as the electrolyte. The solubilized polymer is believed to increase viscosity near the surfaces of the electrodes. The increase in viscosity is believed to effectively partially immobilize the acid, thereby resisting convective flows and reducing acid stratification.

Multiple ways of introducing the acid-soluble and acid-stable polymer to the electrolyte have been discovered. Additional aspects and advantages will be apparent from the following detailed description of preferred embodiments, which proceeds with reference to the accompanying drawings.

DETAILED DESCRIPTION OF PREFERRED EMBODIMENTS

As discussed above, it has been discovered that introducing an acid-soluble and acid-stable polymer with a high molecular weight into the electrolyte of a battery can be used to reduce acid stratification during use of the battery. Preferably, enough of the acid-soluble and acid-stable polymer with a high molecular weight is dissolved in the electrolyte to increase the viscosity of the electrolyte by at least 25%, by about 1.25 times to about 15 times, by about 1.25 times to about 10 times, or by about 1.5 times to about 7 times. For example, this preferred viscosity increase can be achieved if the acid-soluble and acid-stable polymer constitutes about 0.05 wt % to about 5 wt %, about 0.05 wt % to about 1 wt. %, about 0.05 wt % to less than 1 wt. %, or about 0.5 wt % to about 2.0 wt % of the electrolyte. Multiple ways of introducing the acid-soluble and acid-stable polymer to the electrolyte are disclosed herein.

In a first preferred embodiment, battery separators having a separator incorporating an acid-soluble and acid-stable polymer with a high molecular weight can be used and the acid-soluble and acid-stable polymer with a high molecular weight allowed to dissolve into the electrolyte.

The separator will typically have first and second opposite major surfaces. The acid-soluble and acid-stable polymer can be coated on one or both of the first and second opposite major surfaces. The coating can be continuous or discontinuous on one or both of the first and second opposite major surfaces. Examples of discontinuous coatings include separators patterned with dots, stripes, or other patterns. The coating can penetrate completely or partially into the bulk structure of one or more components of the separator. Alternatively, the coating may be only on the surface of one or more components of the separator.

In a variation of the first preferred embodiment, the acid-soluble and acid-stable polymer with a high molecular weight can be incorporated into the bulk structure of the separator, as opposed to applied as a coating, and thereby dissolve into the electrolyte from within the bulk structure.

In another variation of the first preferred embodiment, any substrate, such as a scrim, a battery pasting paper, or other dissolvable or non-dissolvable battery component could incorporate the acid-soluble and acid-stable polymer with a high molecular weight. For example, the battery pasting paper could include the acid-soluble and acid-stable polymer with a high molecular weight and then the pasting paper allowed to dissolve and release the polymer into the electrolyte solution during manufacture of the battery.

In a second preferred embodiment, the acid-soluble and acid-stable polymer with a high molecular weight can be added directly to the battery electrolyte. The electrolyte can include sulfuric acid and also phosphoric acid, such as up to 10 wt %.

Figure 14:
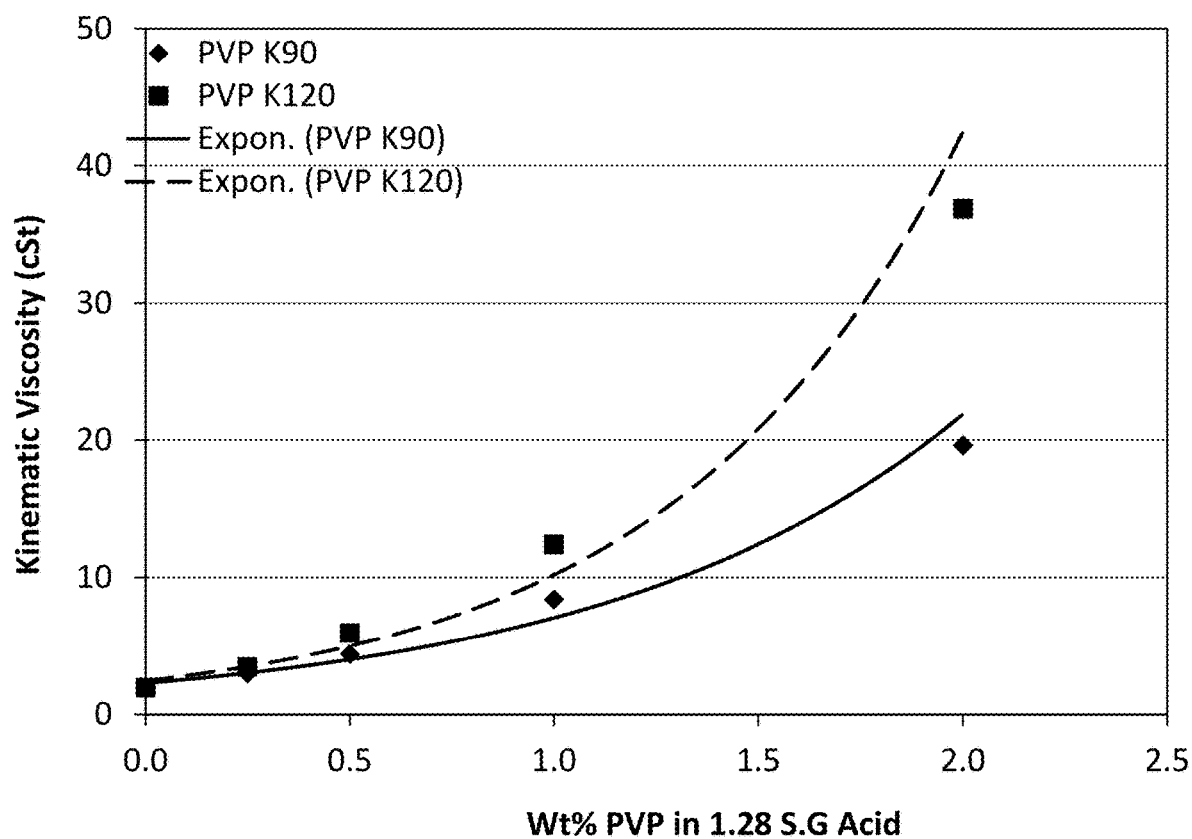
FIG. 14 depicts the results of viscosity measurements for particular concentrations of two different grades of an exemplary acid-soluble and acid-stable polymer dissolved in acid.

The concentration of the acid-soluble and acid-stable polymer in the electrolyte (either directly added or as result of dissolving from the separator or other substrate) can be determined based on factors such as cost, viscosity, and electrolyte conductivity. FIG. 14 depicts the results of kinematic viscosity (kinematic viscosity, $v=\mu/\rho$, is the measure of a fluid's resistance to flow when no external force, other than gravity, is acting on it) measurements for different concentrations of two high molecular weight PVP grades (K90 and K120) dissolved in 1.28 specific gravity sulfuric acid. As can be seen from FIG. 14, the kinematic viscosity increases exponentially with increasing polymer concentration. It may be desirable for the acid-soluble and acid-stable polymer concentration to be 5 wt % or less, such as, for example, about 0.05 wt % to about 5 wt %, about 0.1 wt % to about 1 wt. %, about 0.1 wt % to less than 1 wt. %, or about 0.5 wt % to about 2.0 wt %.

Table 1 depicts changes in sulfuric acid viscosity with addition of different amounts of PVP, as calculated from FIG. 14.

TABLE 1

| wt % PVP K90 in 1.28 S.G Acid | Kinematic Viscosity (cSt) | Change (X) |
|---|---|---|
| 0.00 | 1.96 | |
| 0.05 | 2.46 | 1.26 |
| 0.10 | 2.61 | 1.33 |
| 0.50 | 4.10 | 2.09 |
| 1.00 | 7.22 | 3.68 |
| 0.00 | 1.96 | |
| 0.05 | 2.70 | 1.38 |
| 0.10 | 2.90 | 1.48 |
| 0.50 | 5.13 | 2.62 |
| 1.00 | 10.47 | 5.34 |

Electrolyte including the acid-soluble and acid-stable polymer with a high molecular weight can be added to an incomplete battery (or the polymer added to the electrolyte after it is in the battery), before or after electrode formation. In the case of after electrode formation, the electrolyte would be replacement electrolyte. Additionally, the electrolyte including the acid-soluble and acid-stable polymer with a high molecular weight can be added to a dry charge battery.

As used herein, "an acid-soluble polymer" refers to a polymer sufficiently soluble in acid to provide at least 0.05 wt % of polymer in the battery electrolyte, across the full range of acid concentrations during charge and discharge of the battery (e.g., sulfuric acid with a specific gravity of 1.1 or less to 1.35 or more). As used herein, "an acid-stable polymer" refers to a polymer capable of being dissolved in 100 mL of 1.21 s.g. sulfuric acid, placed into a sealed 125 mL vessel (such as a Nalgene 4 oz. polypropylene wide mouth bottle), and heated at 70° C. in an oven for one week, without noticeable color change of the solution. Thus, an "an acid-stable and acid-soluble polymer" refers to a polymer that satisfies both of the above criteria.

Regardless of delivery method, the molecular weight of the polymer is preferably greater than 500,000 g/mol, such as 500,000 g/mol to 30 million g/mol, 1 million g/mol to 30 million g/mol, 1 million g/mol to 10 million g/mol, and 1 million g/mol to 7 million g/mol, to impart sufficient viscosity to the electrolyte at a low concentration of the polymer. Preferred polymers include polyacrylamides, polyvinyl pyrrolidones (PVP), copolymers including either or both, and mixtures of the foregoing. Non-limiting examples of other possible polymers include polyarylates, polyacrylates (such as, polyhydroxyethyl acrylate (pHEA) and polyhydroxypropyl acrylate (pHPA)), polymethacrylates (such as, polyhydroxyethyl methacrylate (pHEMA), polyglycidyl methacrylate (pGMA), and polyhydroxypropyl methacrylate (pHPMA)), polyethylene oxides, copolymers including one or more of the foregoing, or mixtures of any of the foregoing.

In the first preferred embodiment, the separator may also include additives (such as in admixture with the acid-soluble and acid-stable polymer with a high molecular weight). In the second preferred embodiment, the battery electrolyte may also include other additives. Exemplary separator additives include rubber latex, antimony suppression agents, additives for reducing water loss (e.g., gassing prevention), wettability-enhancing agents, and inorganic materials. Exemplary electrolyte additives include antimony suppression agents, additives for reducing water loss (e.g., gassing prevention), deep discharge supporting agents, such as sodium sulfate, and cycle life enhancers, such as phosphoric acid. Some of the additives may have multiple functions and/or may be applicable to both preferred embodiments.

Antimony suppression agents include many organic molecules that mask the presence of antimony deposited on the negative electrode due to corrosion of the positive electrode grid. These substances inhibit hydrogen evolution from the antimonial sites and include substituted benzaldehydes, such as vanillin, salicylaldehyde, anisaldehyde, veratraldehyde, and p-propoxyacetophenone.

Additives for reducing water loss also include many surfactants that act as hydrogen-evolution inhibitors. Examples of hydrogen-evolution inhibitors include non-ionic surfactants such as polyoxyethyleneglycol octophenyl ether (Triton X-100), fatty alcohol ethoxylates, and ethylene-propylene oxide block copolymers.

Wettability-enhancing agents can include surface active molecules, such as sodium dodecylbenzene sulfonate or sodium dihexyl sulfosuccinate.

The inorganic material can include an inorganic oxide, carbonate, or hydroxide, such as, for example, alumina, silica, zirconia, titania, mica, boehmite, magnesium hydroxide, calcium carbonate, and mixtures thereof. The inorganic material can be in particulate form (e.g., colloidal silica and fumed silica) or powder form (e.g., phenolics).

In either preferred embodiment, the separator can include a microporous silica-filled polyethylene web, such as manufactured by ENTEK. In another embodiment, the separator can include any web, such as a phenol-resorcinol-formaldehyde web (e.g., Darak) or a polyether sulfone web. In yet another embodiment, the separator can include a fiber mat (woven or nonwoven), a synthetic pulp separator (such as with or without inorganic filler), a glass mat (including absorbent glass mat (AGM)), or combinations thereof. The foregoing possible separators can also be combined with each other and/or other substrates, such as a microporous silica-filled polyethylene web combined with a glass mat or scrim.

In the first preferred embodiment, when the separator is a composite, the entire composite can be coated with the acid-soluble and acid-stable polymer. Alternatively, only one component of the composite can be coated with the acid-soluble and acid-stable polymer. For example, in a composite containing a microporous silica-filled polyethylene web and a glass mat, only the glass mat may be coated, only the polyethylene web may be coated, or both components may be coated. One or more components of the composite can be coated prior to assembly as the composite or coated post-composite assembly.

The term "coating" as used herein does not limit the manner of applying the coating to one or more components of the separator. The coating can be applied by dipping the separator in a bath of the polymer, spraying the polymer on the separator, gravure roll coating, reverse roll coating, slot die coating, knife edge coating, or combinations thereof. The coating can also be applied during formation of one or more components of the separator. For example, the acid-soluble and acid-stable polymer can function as a binder for a component of the separator. Thus, by way of non-limiting example, the acid-soluble and acid-stable polymer may be incorporated into a glass mat as a polymer binder, such as during manufacture of the glass mat via a paper making process.

Figure 9:
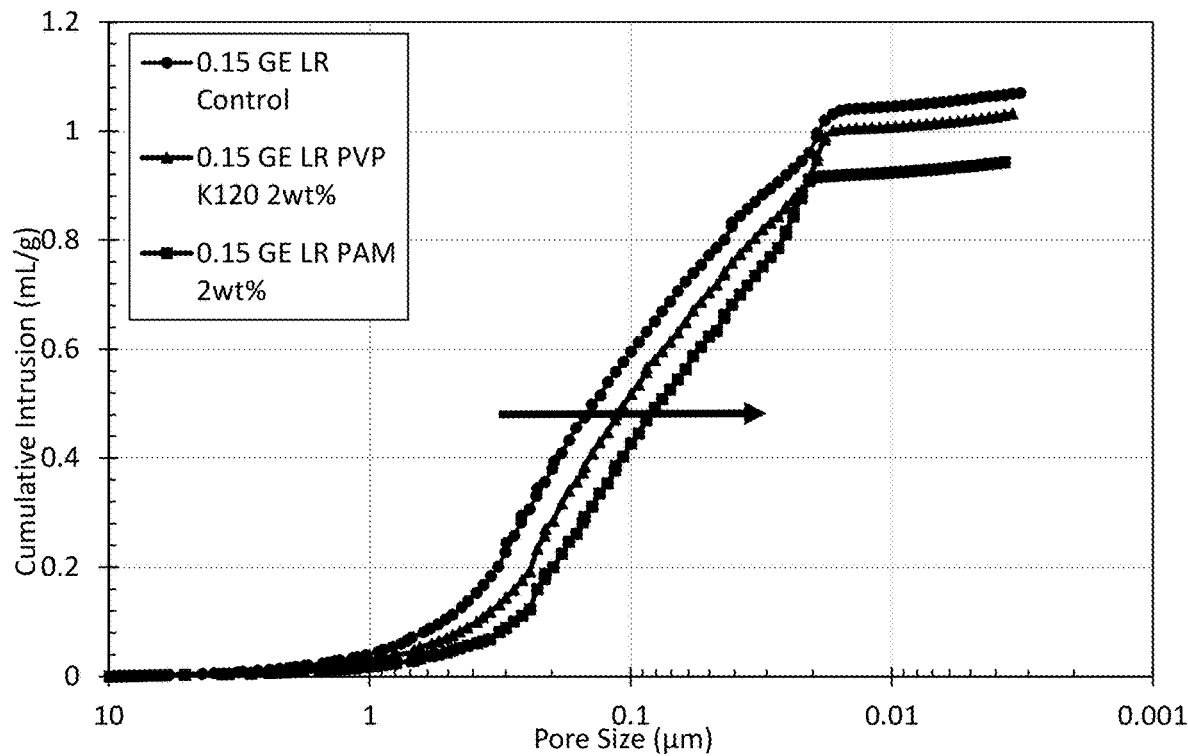
FIG. 9 illustrates cumulative pore volume as determined by mercury porosimetry for examples 2, 6, and comparative example 1.
Figure 10:
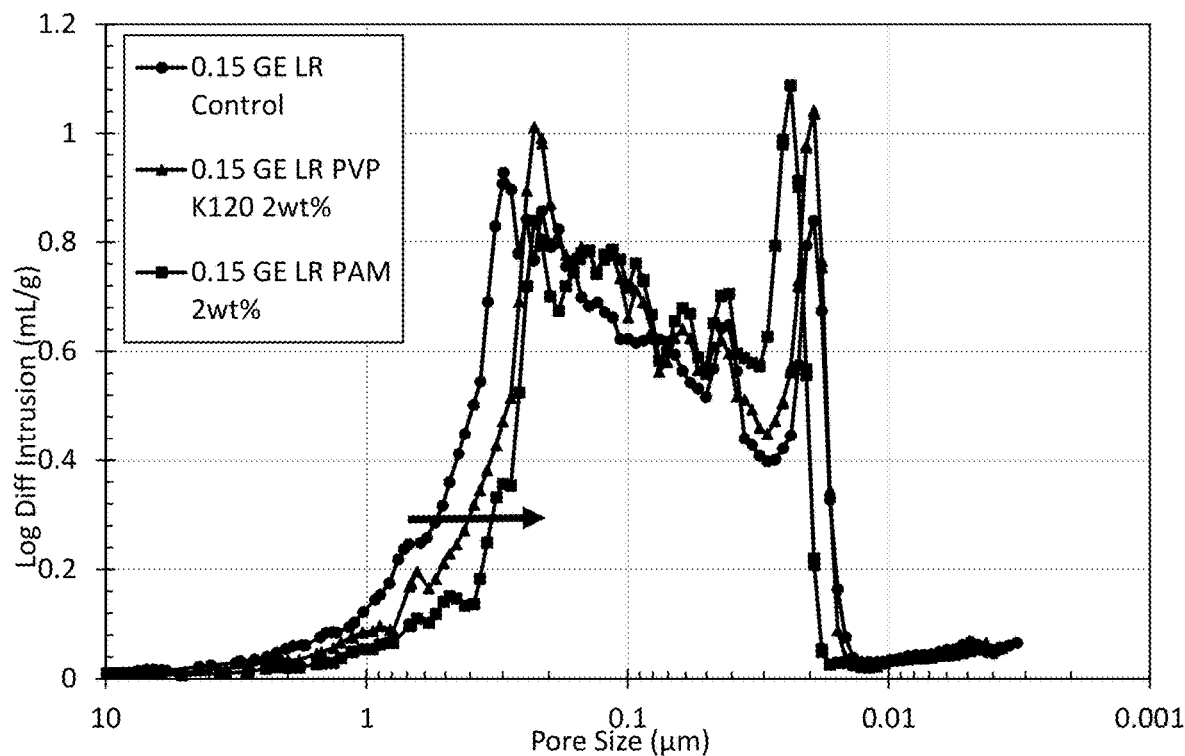
FIG. 10 illustrates pore size distribution as determined by mercury porosimetry for examples 2, 6, and comparative example 1.
Figure 11:
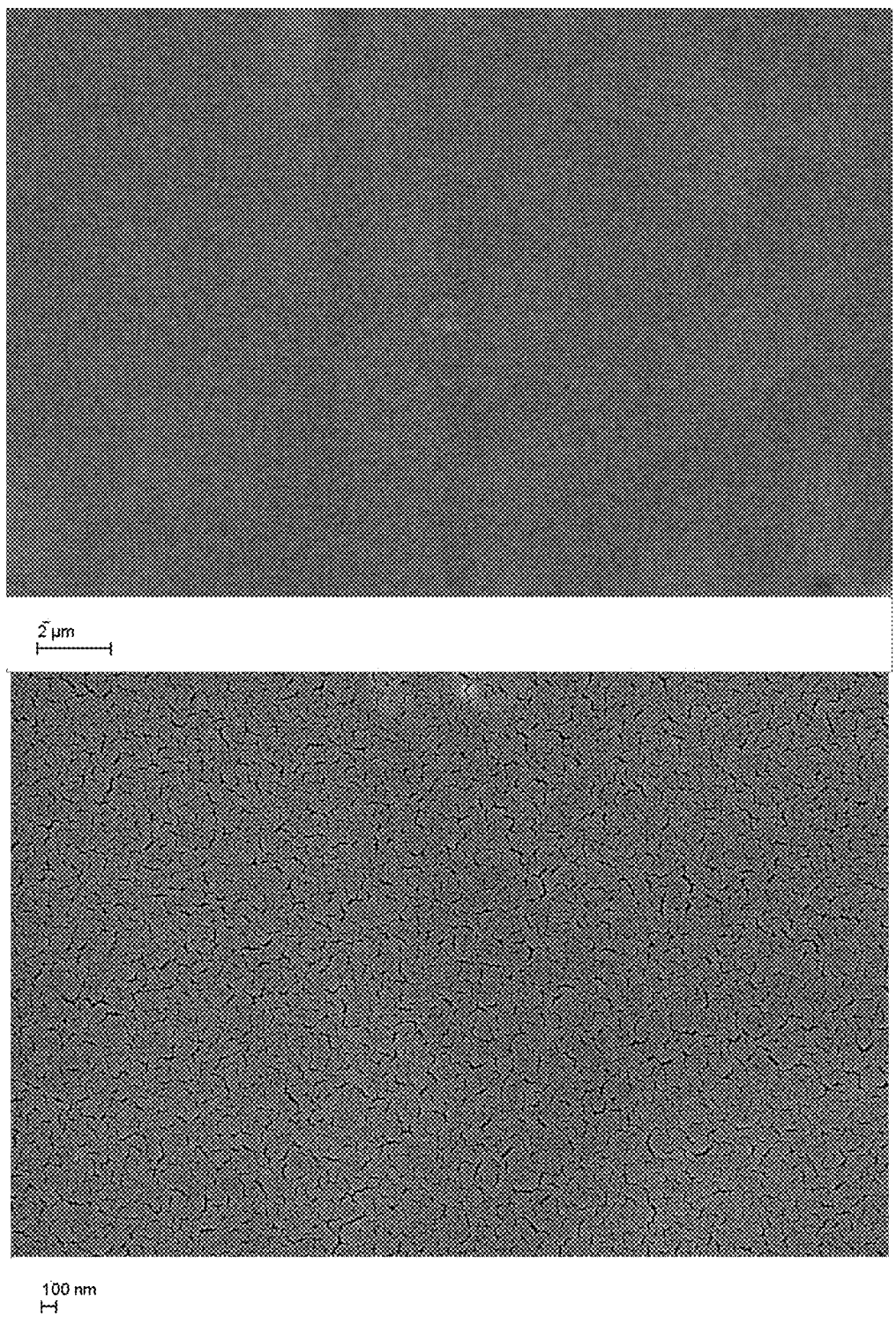
FIG. 11 illustrates surface SEMs for example 2 (top panel at 2 microns; bottom panel at 100 nm).
Figure 12:
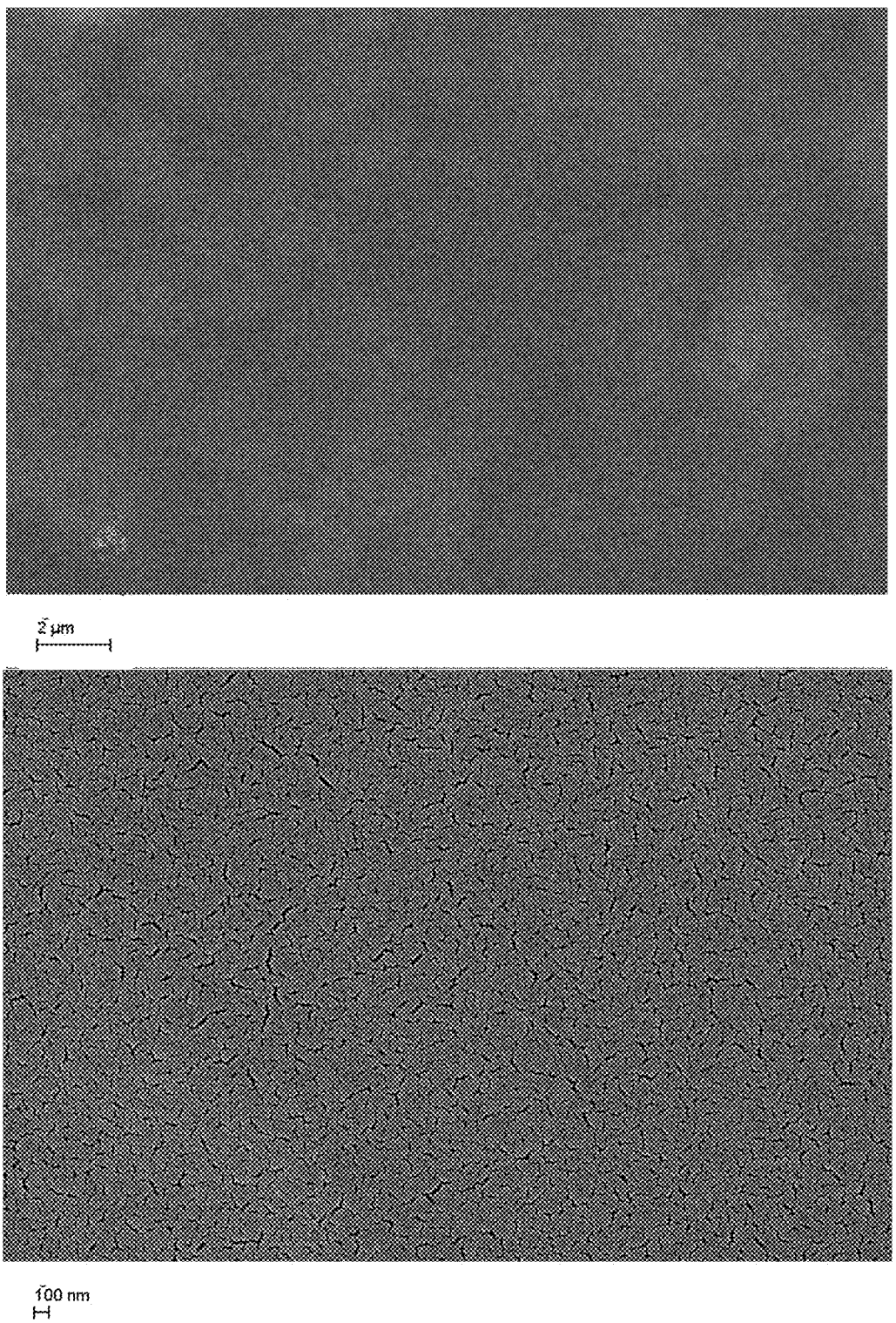
FIG. 12 illustrates surface SEMs for example 6 (top panel at 2 microns; bottom panel at 100 nm).
Figure 13:
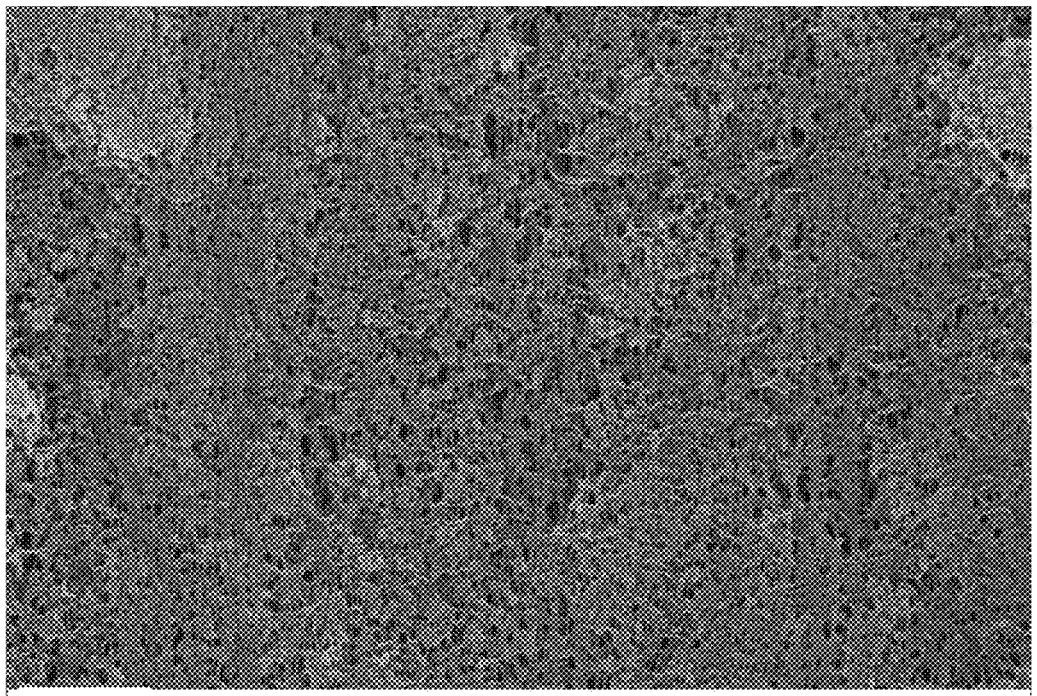
FIG. 13 illustrates surface SEMs for an uncoated control separator (top panel at 2 microns; bottom panel at 100 nm).
Figure 13:
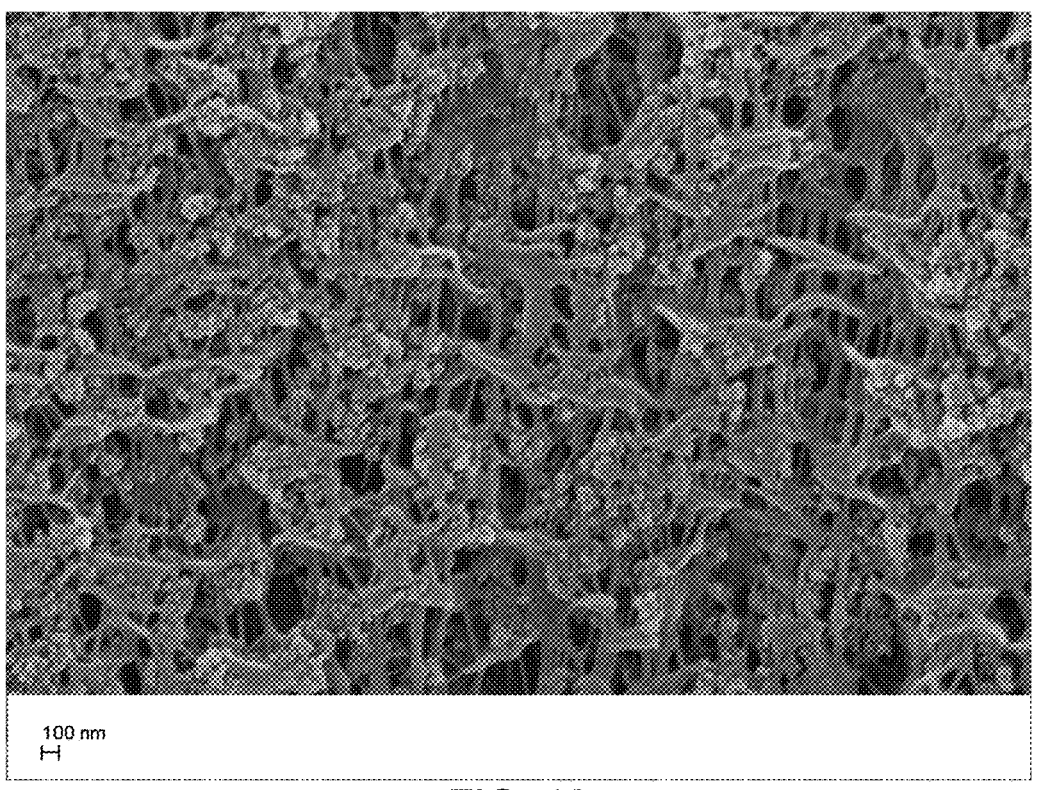

When the separator includes a microporous silica-filled polyethylene web, and the acid-soluble and acid-stable polymer with a high molecular weight is applied as a coating, the coating preferably decreases the average pore size of the separator of the coated region by at least 5% (including about 5% to about 50% and about 10% to about 40%), prior to exposure of the separator to an electrolyte (which would result in dissolving of at least a portion of the coating). FIGS. 11 and 12 depict surface scanning electron microscope (SEM) images of the coated separators of Examples 2 and 6, respectively. FIG. 13 depicts surface SEM images of an uncoated separator of the same type as Comparative Example 1. As can be seen, the acid-soluble and acid-stable polymer with a high molecular weight seems to largely fill the surface pores of the separator. FIGS. 9 and 10 plot the pore size distributions for the coated separators of Examples 2 and 6 and the uncoated separator of Comparative Example 1. As can be seen, the acid-soluble and acid-stable polymer with a high molecular weight is present in sufficient amount to reduce the average pore size of the coated separator. Or stated another way, the coat weight of the coating is sufficient to reduce the average pore size of the coated separator. Table 2 depicts the reduction in average pore size, as determined by mercury porosimetry, for Comparative Example 1 and Examples 2 and 6.

TABLE 2

| Sample | | Comparative Example 1 (control) | Example 2 | Example 6 |
|---|---|---|---|---|
| Median Pore Diameter (Volume) = | μm | 0.124 | 0.100 | 0.087 |
| Change in average Pore Diameter | % | | 19 | 30 |

Either of the preferred embodiments can be used in an energy storage device, such as a battery. Both of the preferred embodiments can be used together. Alternatively, in the first preferred embodiment, the electrolyte can be a conventional electrolyte, such as an electrolyte that includes sulfuric acid and up to 10 wt % phosphoric acid. Likewise, the second preferred embodiment can be used with a variety of battery separators, instead of with the coated separators of the first preferred embodiment.

Electrolytes and porous battery separators that reduce acid stratification have a number of benefits. Other benefits of the electrolytes and coated separators disclosed herein will be apparent to those skilled in the art.

Example 1

1.5 wt. % Polyacrylamide (PAM) solution was prepared by mixing 15 g of PAM (Mw~5-6 Million g/mol) in 985 g of deionized water using a high shear mixer. A polyethylene/silica (PE/SiO$_2$) separator (ENTEK 161-0.9-0.15 GE_LR) (161 mm×127 mm) was coated by dipping it into the 1.5 wt % PAM solution, withdrawing it and hanging it in a convection oven at 80° C. to fully dry. The coated separator was then soaked in 1.28 s.g. sulfuric acid and its electrical resistance determined to be 57.9 mohm-cm$^2$.

Example 2

Figure 1:
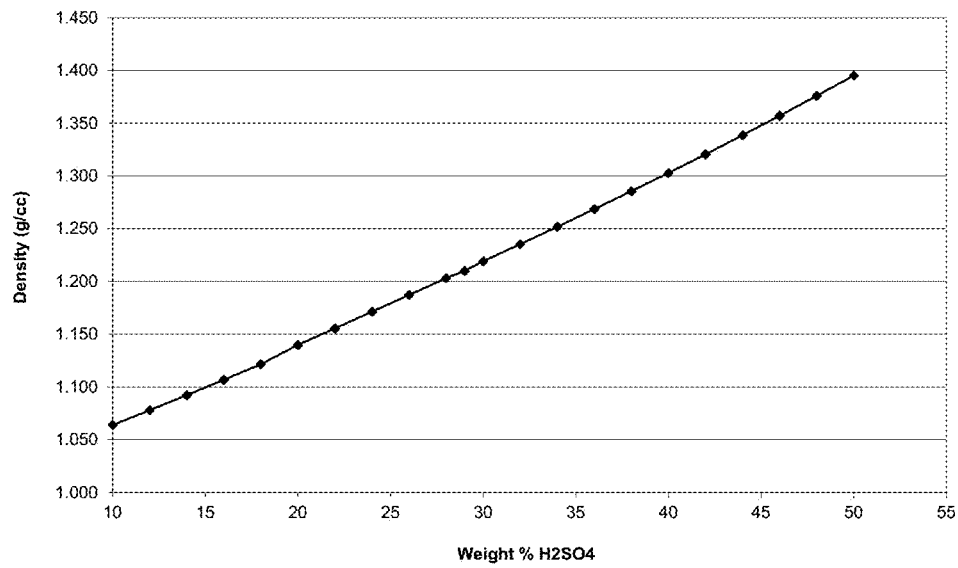
FIG. 1 depicts sulfuric acid density as a function of concentration at 20° C. (1).
Figure 2:
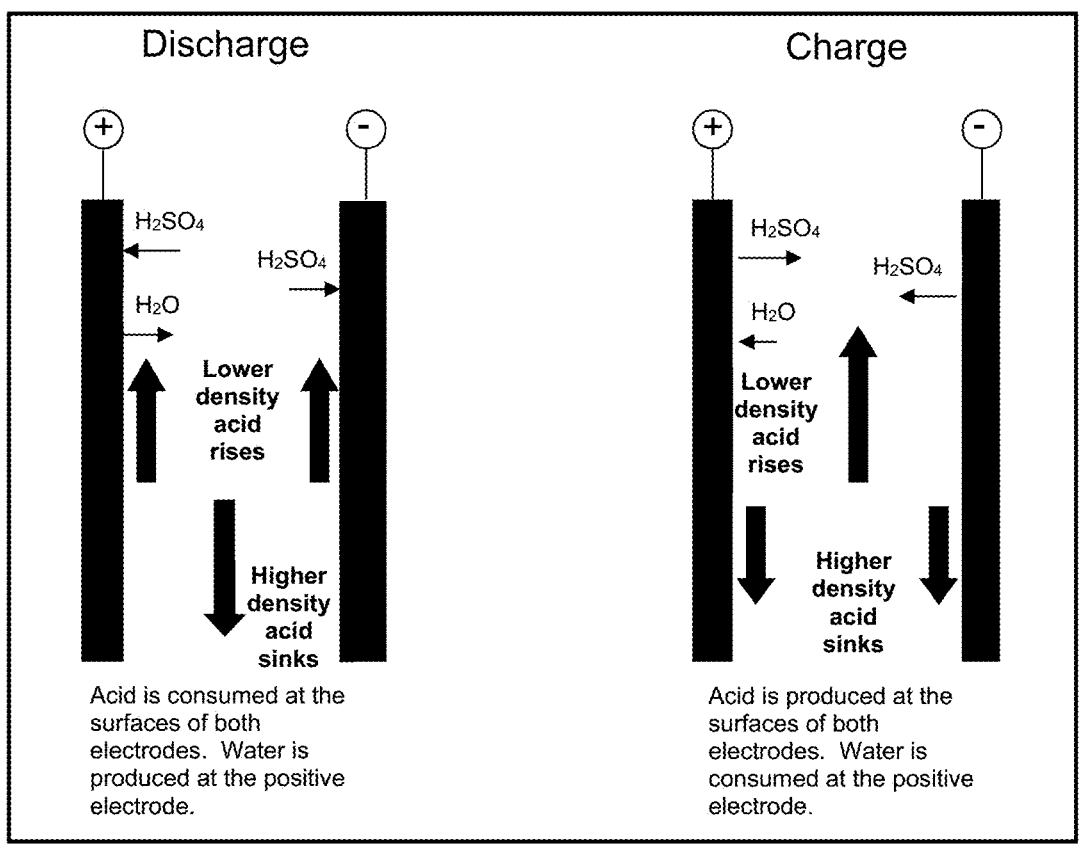
FIG. 2 illustrates convective flows of the electrolyte during charge and discharge.
Figure 3:
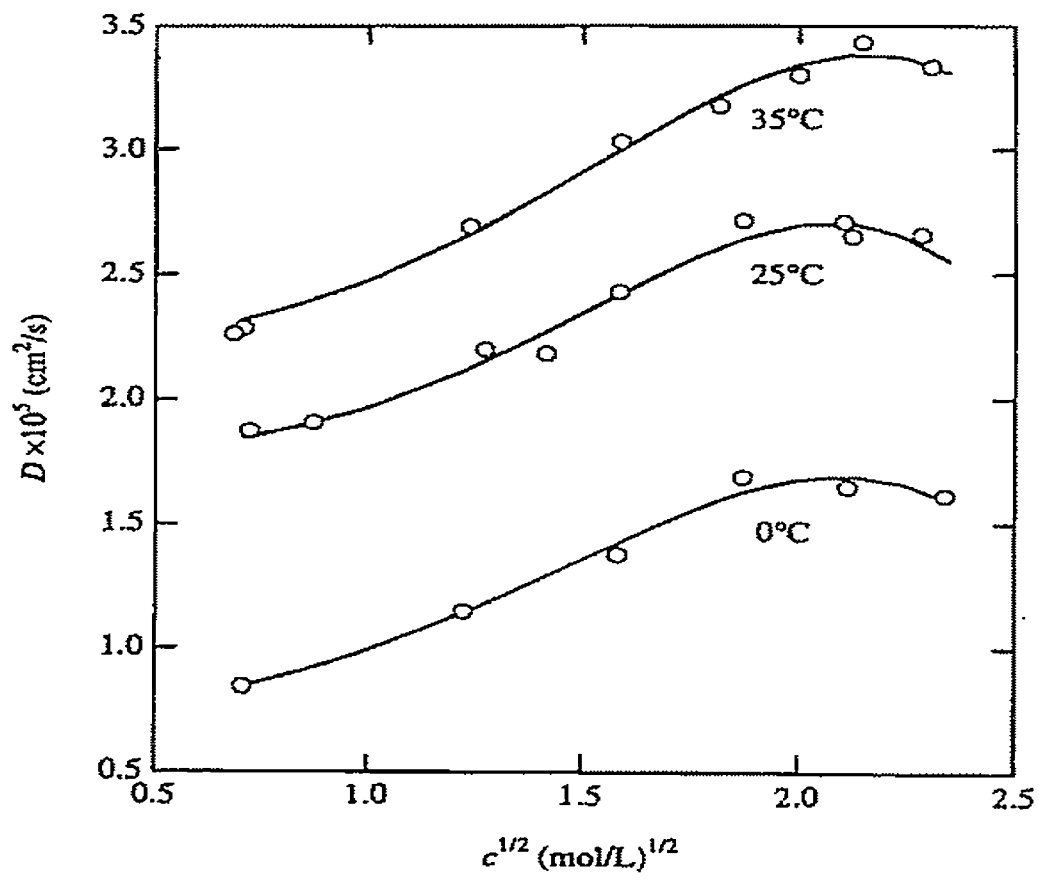
FIG. 3 depicts a relationship between diffusion coefficient and concentration of sulfuric acid at various temperatures (2).
Figure 4A:
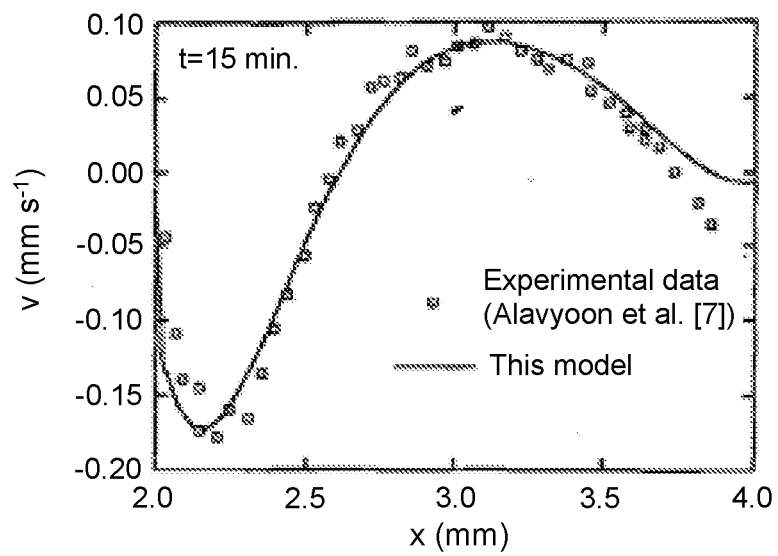
FIG. 4A depicts predicted and measured convection velocity gradients across the electrolyte space between the positive and negative electrodes at half-height of the electrodes during charge for 15 minutes (5).
Figure 4B:
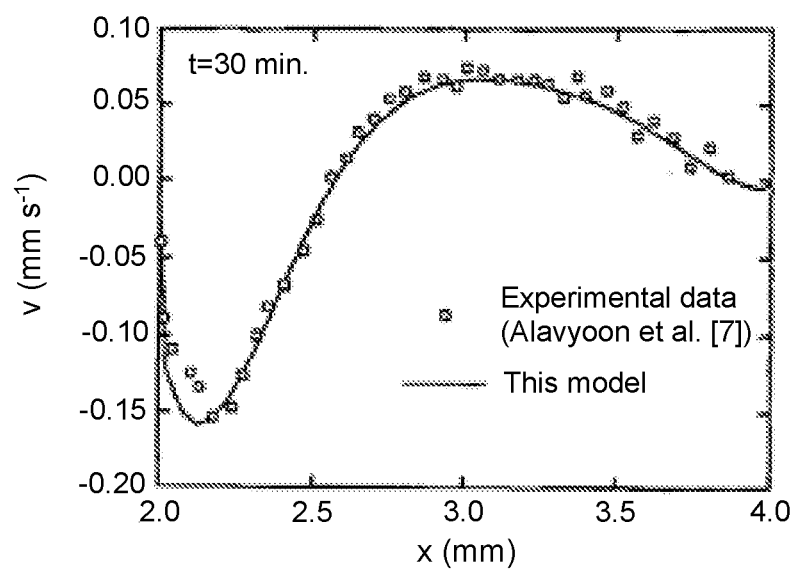
FIG. 4B depicts predicted and measured convection velocity gradients across the electrolyte space between the positive and negative electrodes at half-height of the electrodes during charge for 30 minutes (5).
Figure 4C:
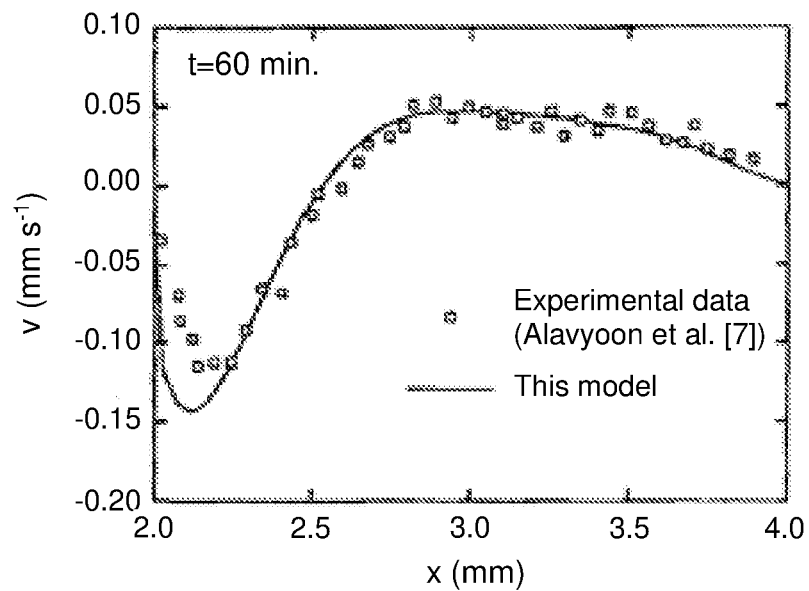
FIG. 4C depicts predicted and measured convection velocity gradients across the electrolyte space between the positive and negative electrodes at half-height of the electrodes during charge for 60 minutes (5).
Figure 5:
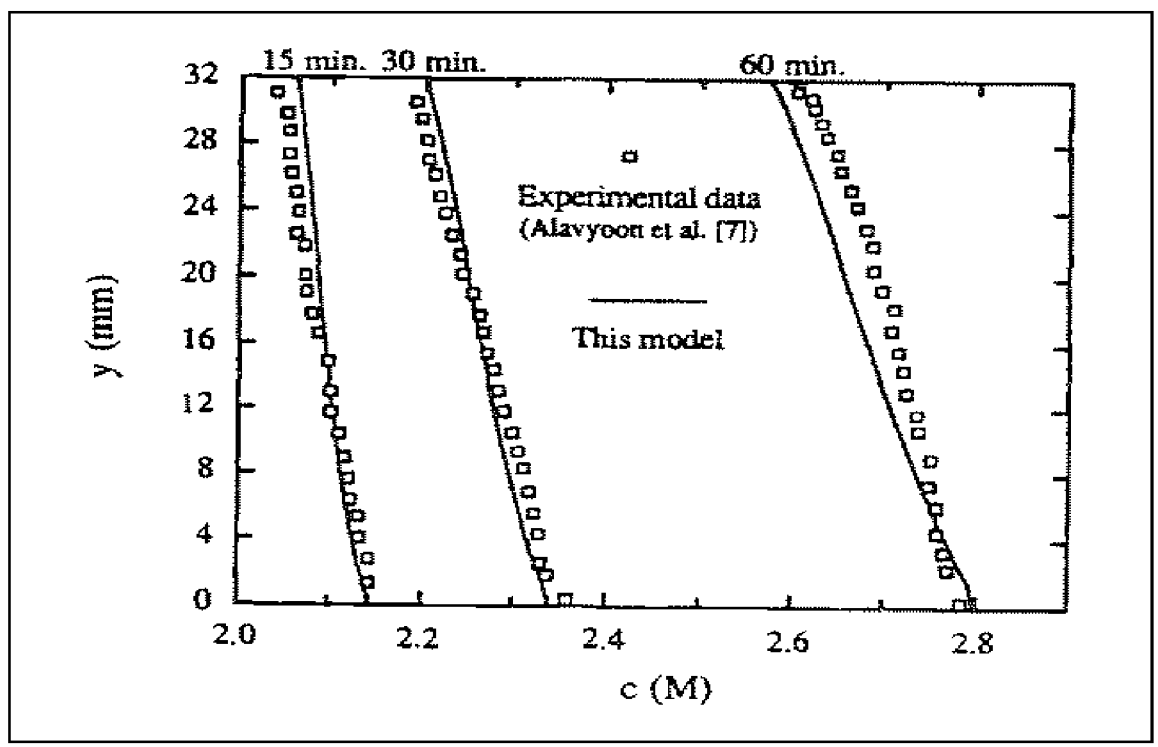
FIG. 5 depicts a comparison of predicted and measured vertical concentration profiles in the middle of the electrolyte space during charge at 9.4 ma/cm² at charge times of 15, 30, and 60 minutes (5).
Figure 6:
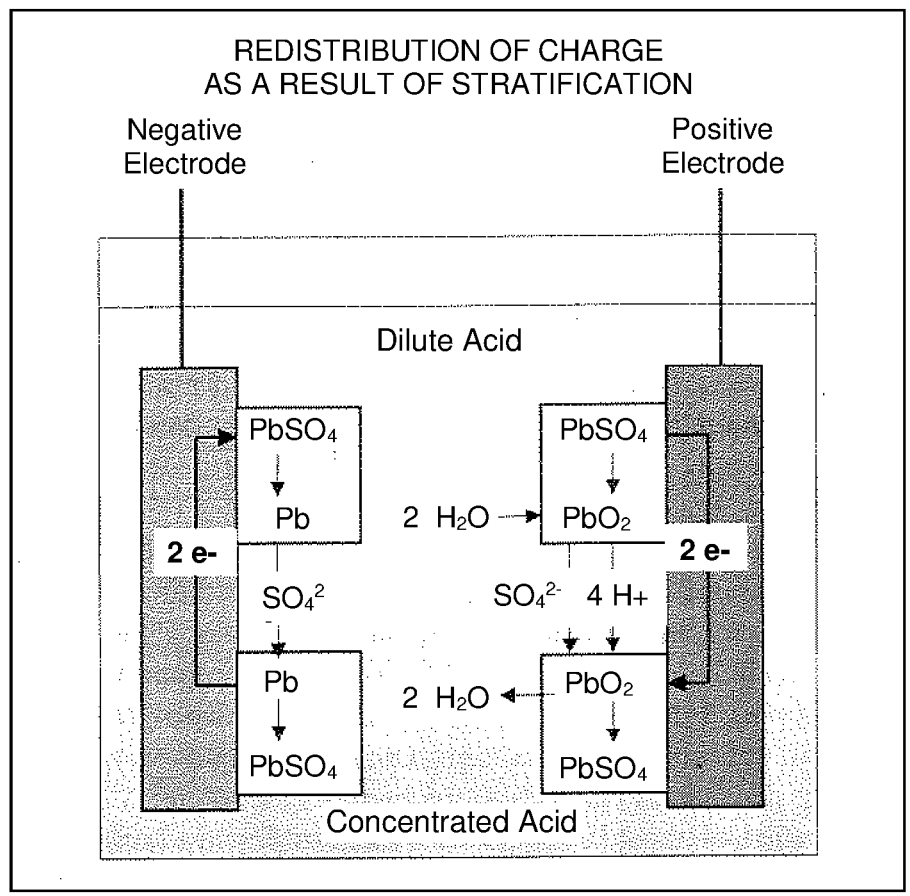
FIG. 6 depicts a mechanism of the redistribution of charge during open circuit in a battery with acid stratification (2).
Figure 7:
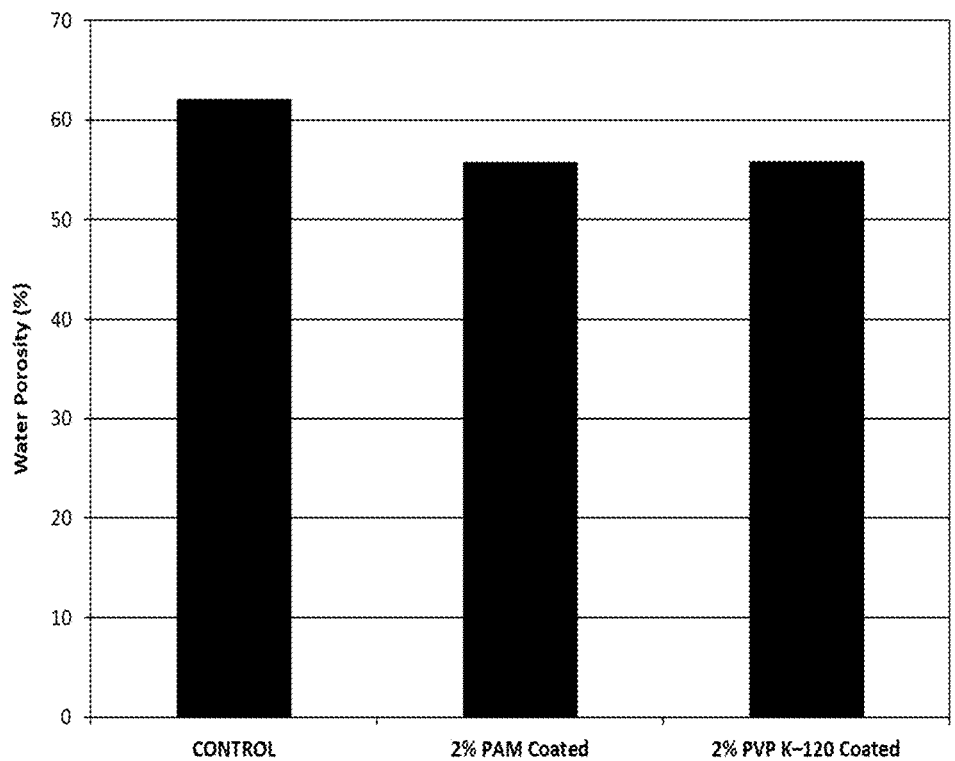
FIG. 7 illustrates the results of water porosity experiments for examples 2, 6, and comparative example 1.

2.0 wt. % Polyacrylamide (PAM) solution was prepared by mixing 20 g of PAM (Mw~5-6 Million g/mol) in 980 g of deionized water using a high shear mixer. A polyethylene/silica (PE/SiO$_2$) separator (ENTEK 161-0.9-0.15 GE_LR) (161 mm×127 mm) was coated by dipping it into the 2.0 wt % PAM solution, withdrawing it and hanging it in a convection at 80° C. to fully dry. The coated separator was then soaked in 1.28 s.g. sulfuric acid and its electrical resistance determined to be 61.3 mohm-cm$^2$ (see FIG. 8). Water porosity was determined and is illustrated in FIG. 7. Mercury porosimetry was also determined. Cumulative pore volume is illustrated in FIG. 9. Pore size distribution is illustrated in FIG. 10. Surface SEM images are shown in FIG. 11, with the lower panel at increased magnification.

Example 3

3.0 wt. % Polyvinyl pyrrolidone (PVP K90) solution was prepared by mixing 30 g of PVP K90 (Mw~1.5 Million g/mol) in 970 g of deionized water using a high shear mixer. A polyethylene/silica (PE/SiO$_2$) separator (ENTEK 161-0.9-0.15 GE_LR) (161 mm×127 mm) was coated by dipping it into the 3.0 wt % PVP K90 solution, withdrawing it and hanging it in a convection oven at 80° C. to fully dry. The coated separator was then soaked in 1.28 s.g. sulfuric acid and its electrical resistance determined to be 71.7 mohm-cm$^2$.

Example 4

5.0 wt. % Polyvinyl pyrrolidone (PVP K90) solution was prepared by mixing 50 g of PVP K90 (Mw~1.5 Million g/mol) in 950 g of deionized water using a high shear mixer. A polyethylene/silica (PE/SiO$_2$) separator (ENTEK 161-0.9-0.15 GE_LR) (161 mm×127 mm) was coated by dipping it into the 5.0 wt % PVP K90 solution, withdrawing it and hanging it in a convection at 80° C. to fully dry. The coated separator was then soaked in 1.28 s.g. sulfuric acid and its electrical resistance determined to be 74.4 mohm-cm$^2$.

Example 5

2.5 wt. % Polyvinyl pyrrolidone (PVP K120) solution was prepared by mixing 25 g of PVP K120 (Mw~3.0 Million g/mol) in 975 g of deionized water using a high shear mixer. A polyethylene/silica (PE/SiO$_2$) separator (ENTEK 161-0.9-0.15 GE_LR) (161 mm×127 mm) was coated by dipping it into the 2.5 wt % PVP K120 solution, withdrawing it and hanging it in a convection oven at 80° C. to fully dry. The coated separator was then soaked in 1.28 s.g. sulfuric acid and its electrical resistance determined to be 65.5 mohm-cm$^2$.

Example 6

2.0 wt. % Polyvinyl pyrrolidone (PVP K120) solution was prepared by mixing 20 g of PVP K120 (Mw~3.0 Million g/mol) in 980 g of deionized water using a high shear mixer. A polyethylene/silica (PE/SiO$_2$) separator (ENTEK 161-0.9-0.15 GE_LR) (161 mm×127 mm) was coated by dipping it into the 2.0 wt % PVP K120 solution, withdrawing it and hanging it in a convection oven at 80° C. to fully dry. The coated separator was then soaked in 1.28 s.g. sulfuric acid and its electrical resistance determined to be 62.3 mohm-cm$^2$ (see FIG. 8). Water porosity was determined and is illustrated in FIG. 7. Mercury porosimetry was also determined. Cumulative pore volume is illustrated in FIG. 9. Pore size distribution is illustrated in FIG. 10. Surface SEM images are shown in FIG. 12, with the lower panel at increased magnification.

Example 7

5.0 wt. % Polyvinyl pyrrolidone (PVP K90) solution was prepared by mixing 50 g of PVP K90 (Mw~1.5 Million g/mol) in 950 g of deionized water using a high shear mixer. A cut out piece (162 mm×254 mm) of Evalith™ B10 glass fiber nonwoven (~330 microns thick) (Johns Manville, Denver, Colo.) was coated by dipping it into the 5.0 wt % PVP K90 solution, withdrawing it, and hanging it in a convection oven at 80° C. to fully dry. The coated glass fiber nonwoven was then used to build to an acid stratification cell test as discussed in example 8 below.

Comparative Example 1

Figure 8:
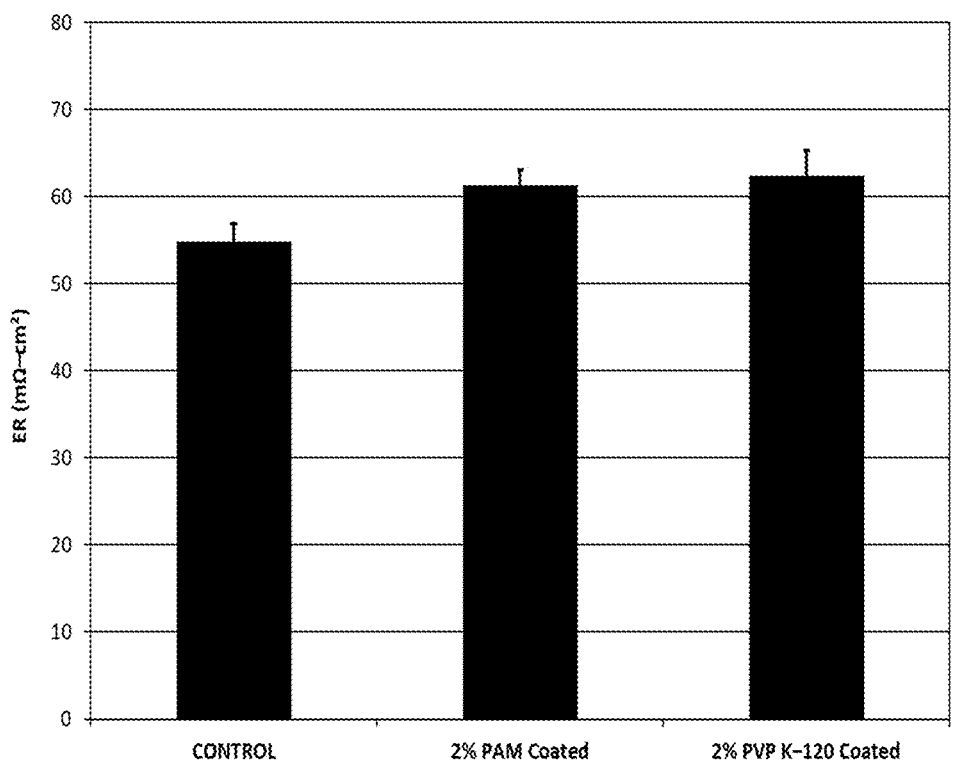
FIG. 8 illustrates the results of electrical resistance experiments for examples 2, 6, and comparative example 1.

A polyethylene/silica (PE/SiO$_2$) separator (ENTEK 161-0.9-0.15 GE_LR) (161 mm×127 mm), without additional treatment, was soaked in 1.28 s.g. sulfuric acid and its electrical resistance determined to be 55 mohm-cm$^2$ (see FIG. 8). Water porosity was determined and is illustrated in FIG. 7. Mercury porosimetry was also determined. Cumulative pore volume is illustrated in FIG. 9. Pore size distribution is illustrated in FIG. 10.

Example 8—Acid Stratification Cell Test

A rectangular test cell was fabricated with approximate internal dimensions of 17 cm wide, 20 cm high and ¾ cm thick made from polycarbonate. Electrodes were harvested from a commercially available Deka YB16-B motorcycle battery. Each cell contained a positive and negative electrode which ⅛" 99% lead wire was used to add contacts. Pieces of ENTEK 161-0.9-0.15 GE_LR separator, 24.5 cm and 12.25 cm long, were prepared as described in examples 1, 3, 4, and 5 and comparative example 1. In separate experiments, each 24.5 cm piece was used to envelope the negative electrode. Then the positive electrode was positioned between the envelope and the respective 12.25 cm piece of separator. In a further separate experiment, pieces of B10 glass fiber nonwoven, 24.5 cm and 12.25 cm long, were prepared as described in example 7. An uncoated ENTEK 162-0.80-0.25 GE_LR separator was used to envelope the negative electrode. The 24.5 cm piece was wrapped around the outside ribs of the uncoated separator. Then the positive electrode was positioned between the envelope and the 12.25 cm piece of coated B10 glass fiber nonwoven. The ribbed side of an uncoated piece of ENTEK 162-0.80-0.25 GE_LR separator was placed adjacent the coated nonwoven 12.25 cm piece and sandwiched between the positive electrode and one of the test cell walls. In each experiment, the cell was then filled with 170 mL of 1.21 s.g. sulfuric acid, charged at 0.3 A to 2.6 V, then discharged at 0.5 A to 1.8 V. The cell was cycled 5 times between 2.6 V and 1.8 V at constant current. After the cycling was completed, the acid density was measured using an Anton Paar DMA35 density meter with a 16.5 cm sample tube. The density was measured at 1 cm below the surface of the acid, then at 11.5 cm below the surface of the acid. Care was taken to prevent acid mixing either by movement of the cell, sample tube or air bubbles. The difference between the top and bottom density measurements is shown in Table 3. The cells with separators treated with high molecular weight polymers showed much lower differences in acid gravity between the top and the bottom of the cell, indicating a decrease in acid stratification compared to the untreated separator.

TABLE 3

| Example | Sample | Acid Density Difference |
|---|---|---|
| Compar. | Control, 161-0.9-0.25 GE_LR, 170 mL 1.21 s.g., no treatment | 0.0519 |
| 1 | PAM (5-6 mil g/mol MW) Coated, 161-0.9-0.25 GE_LR, 170 mL 1.21 s.g. | 0.0094 |
| 3 | K90 PVP Coated, 161-0.9-0.25 GE_LR, 170 mL 1.21 s.g. | 0.0062 |
| 4 | K90 PVP Coated, 161-0.9-0.25 GE_LR, 170 mL 1.21 s.g. | 0.0035 |
| 5 | K120 PVP Coated, 161-0.9-0.25 GE_LR, 170 mL 1.21 s.g. | 0.0032 |
| 6 | K90 PVP Coated, Evalith™ B10 glass fiber nonwoven, 170 mL 1.21 s.g. | 0.0115 |

Example 9

A sulfuric acid solution was prepared with a final density of 1.21 s.g. 3.63 g of K120 polyvinyl pyrrolidone (PVP) (Mw~3.0 Million g/mol) was added to 600 mL of 1.21 s.g. acid and mixed at room temperature until all the polymer was dissolved.

Figure 15:
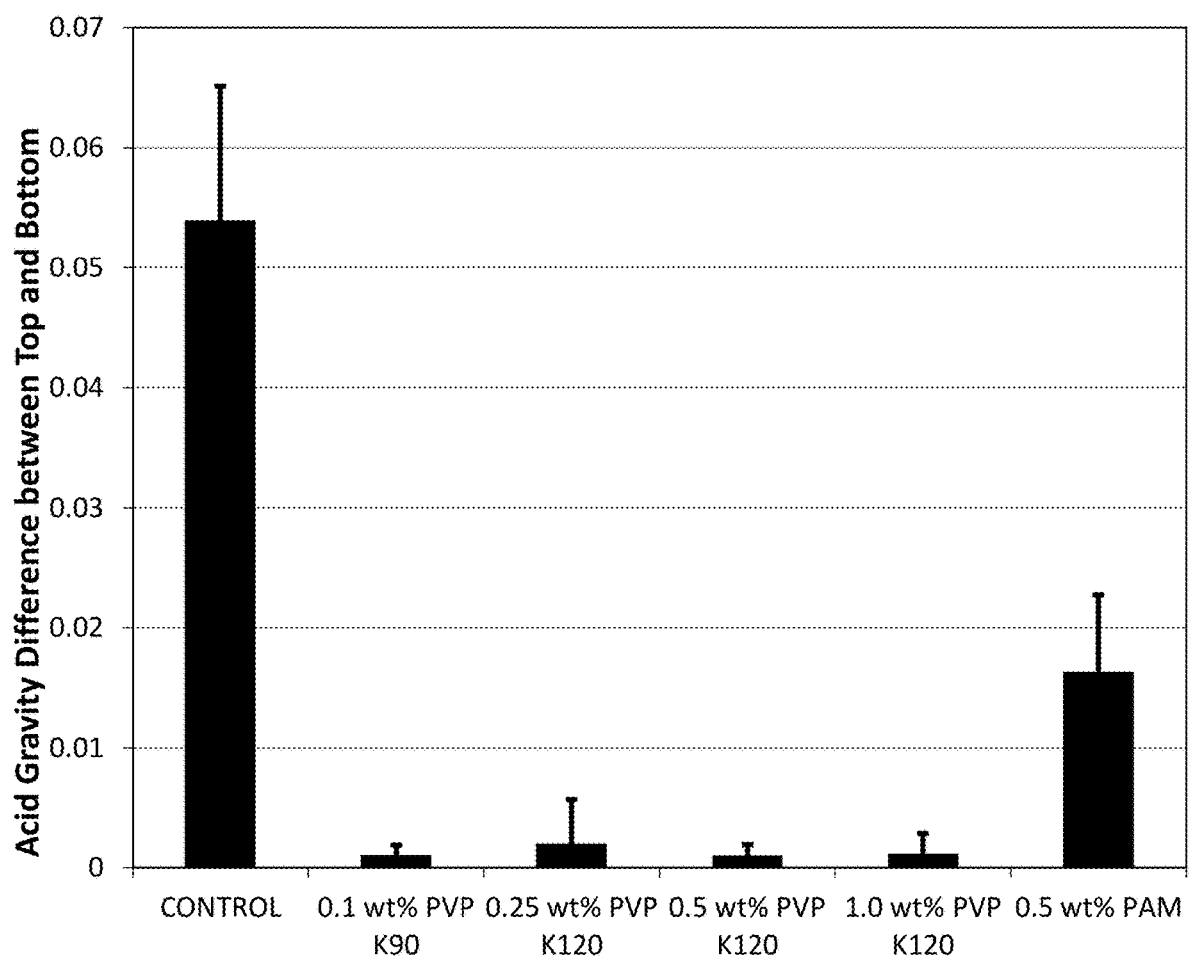
FIG. 15 depicts the results of certain acid stratification experiments at different concentrations of acid-soluble and acid-stable polymers dissolved in acid, as compared to control.

A rectangular test cell was fabricated with approximate internal dimensions of 17 cm wide, 20 cm high and ¾ cm thick made from polycarbonate. Electrodes were harvested from a commercially available Deka YB16-B motorcycle battery. Each cell contained a positive and negative electrode which ⅛" 99% lead wire was used to add contacts. A 24.5 cm and a 12.25 cm piece of ENTEK 161-0.9-0.15 GE_LR separator was used in the test cell. The 24.5 cm piece was used to envelope the negative electrode. Then the positive electrode was positioned between the envelope and the 12.25 cm piece of separator. The cell was then filled with 170 mL of the sulfuric acid solution containing PVP. The cell was then charged at 0.3 A to 2.6 V then discharged at 0.5 A to 1.8 V. The cell was cycled 5 times between 2.6 V and 1.8 V at constant current. After the cycling was completed the acid density was measured using an Anton Paar DMA35 density meter with a 16.5 cm sample tube. The density was measured at 1 cm below the surface of the acid, then at 11.5 cm below the surface of the acid. Care was taken to prevent acid mixing either by movement of the cell, sample tube or air bubbles. The difference between the top and bottom density measurements is shown in Table 4. The cell with acid containing 0.5% PVP showed a much lower difference in acid gravity between the top and the bottom of the cell (as compared to comparative example 1), indicating a decrease in acid stratification. The results are depicted in FIG. 15.

Example 10

A rectangular test cell was fabricated with approximate internal dimensions of 17 cm wide, 20 cm high and ¾ cm thick made from polycarbonate. Electrodes were harvested from a commercially available Deka YB16-B motorcycle battery. Each cell contained a positive and negative electrode which ⅛" 99% lead wire was used to add contacts. A 24.5 cm and a 12.25 cm piece of ENTEK 161-0.9-0.15 GE_LR separator was used in the test cell. The 24.5 cm piece was used to envelope the negative electrode. Then the positive electrode was positioned between the envelope and the 12.25 cm piece of separator. The cell was then filled with 170 mL of 1.21 s.g. sulfuric acid. Polymer was directly added to the top of the cell at 0.25-1 wt % of the acid as follows:

A) 1.0 wt % K120 PVP
B) 0.25 wt % K120 PVP
C) 0.5 wt % PAM
D) 0.1 wt % K90 PVP
E) 1.0 wt % K90 PVP
F) 0.5 wt % PEO
G) 0.5 wt % PAA

The cell was then charged at 0.3 A to 2.6 V then discharged at 0.5 A to 1.8 V. After 1 cycle the polymer was dissolved in the acid. The cell was cycled 5 times between 2.6 V and 1.8 V at constant current. After the cycling was completed the acid density was measured using an Anton Paar DMA35 density meter with a 16.5 cm sample tube. The density was measured at 1 cm below the surface of the acid, then at 11.5 cm below the surface of the acid. Care was taken to prevent acid mixing either by movement of the cell, sample tube or air bubbles. The difference between the top and bottom density measurements is shown in Table 1. The cell with acid containing dissolved polymer showed a lower difference in acid gravity between the top and the bottom of the cell (as compared to comparative example 2), indicating a decrease in acid stratification. The results for 10A-10D are depicted in FIG. 15.

Comparative Example 2

A polyethylene/silica (PE/SiO$_2$) separator (ENTEK 161-0.9-0.15 GE_LR) (161 mm×127 mm), without additional treatment, was soaked in 1.28 s.g. sulfuric acid and its electrical resistance determined to be 55 mohm-cm$^2$. The acid stratification cell test of example 1 was performed with the PE/SiO$_2$ separator, but the cell was filled with 170 mL of 1.21 s.g. sulfuric acid, instead of with sulfuric acid having PVP dissolved therein. The difference between the top and bottom density measurements is shown in Table 4.

TABLE 4

| Example # | Direct addition of acid-soluble and acid-stable polymer Sample | Difference |
|---|---|---|
| Compar. 2 | Control, 161-0.9-0.25 GE_LR, 170 mL 1.21 sg | 0.0519 |
| 9 | 161-0.9-0.25 GE_LR, 170 mL 0.5 wt % K120 PVP added to the 1.21 sg acid | 0.0080 |
| 10A | 161-0.9-0.25 GE_LR, 170 mL 1.0 wt % K120 PVP added to the top of the cell | 0.0011 |
| 10B | 161-0.9-0.25 GE_LR, 170 mL 0.25 wt % K120 PVP added to the top of the cell | 0.0020 |
| 10C | 161-0.9-0.25 GE_LR, 170 mL 0.5 wt % PAM added to the top of the cell | 0.0164 |
| 10D | 161-0.9-0.25 GE_LR, 170 mL 0.1 wt % K90 PVP added to the top of the cell | 0.0011 |
| 10E | 161-0.9-0.25 GE_LR, 170 mL 1.0 wt % K90 PVP added to the top of the cell | 0.0046 |
| 10F | 161-0.9-0.25 GE_LR, 170 mL 0.5 wt % PEO added to the top of the cell | 0.0313 |
| 10G | 161-0.9-0.25 GE_LR, 170 mL 0.5 wt % PAA added to the top of the cell | 0.0414 |

It will be apparent to those having skill in the art that many changes may be made to the details of the above-described embodiments without departing from the underlying principles of the invention.

REFERENCES CITED (1) Hans Bode, *Lead Acid Batteries*, John Wiley & Sons, New York, 1977.
(2) S. Umino and J. Newman, "Temperature Dependence of the Diffusion Coefficient of Sulfuric Acid in Water", Journal of the Electrochemical Society, 144, (4) 1302-1307 (1997).

(3) Paul Ruetschi, "Aging mechanisms and service life of lead-acid batteries", Journal of Power Sources, 127, (2004) pp. 33-44.

(4) F. Alavyoon, A. Ecklund, F. H. Bark, R. I. Karlsson, and D. Simonsson, "Theoretical and Experimental Studies of Free Convection and Stratification of Electrolyte in a Lead-Acid cell During Recharge", Electrochimica Acta, 36, 14, pp. 2153-2164 (1991).

(5) W. B. Gu, C. Y. Wang, and B. Y. Liaw, Numerical Modeling of Coupled Electrochemical and Transport Process in Lead-Acid Batteries", Journal of the Electrochemical Society, 144, (6) 2053-2061 (1997).

(6) Dir Uwe Sauer, "Modeling of local conditions in flooded lead/acid batteries in photovoltaic systems", Journal of Power Sources, 64, (1997) pp. 181-187.

(7) Y. Guo, W. Yan, and J Hu, "Effects of Electrolyte Stratification on Performance of Flood Lead-Acid Batteries", Journal of the Electrochemical Society, 154, (1) A1-A6 (2007).

The invention claimed is:

1. A method of reducing acid stratification in a battery, the method comprising:
introducing an acid-soluble and acid-stable polymer into an aqueous electrolyte of a battery, to thereby increase the viscosity of the aqueous electrolyte;
wherein the acid-soluble and acid-stable polymer comprises at least one of:
polyvinyl pyrrolidone;
polyacrylamide;
copolymers comprising at least one of polyvinyl pyrrolidone or polyacrylamide; or
mixtures comprising at least one of polyvinyl pyrrolidone or polyacrylamide.

2. The method of claim 1, further comprising introducing enough of the acid-soluble and acid-stable polymer to increase the viscosity of the aqueous electrolyte by at least 25%.

3. The method of claim 1, in which the acid-soluble and acid-stable polymer comprises about 0.05 wt % to about 5 wt %.

4. The method of claim 1, further comprising adding the acid-soluble and acid-stable polymer directly into the aqueous electrolyte before or after formation of the battery and dissolving at least a portion the acid-soluble and acid-stable polymer into the aqueous electrolyte.

5. The method of claim 1, wherein the acid-soluble and acid-stable polymer comprises a molecular weight of greater than 500,000 g/mol.

6. An aqueous battery electrolyte comprising:
aqueous sulfuric acid; and
an acid-soluble and acid-stable polymer comprising at least one of:
polyvinyl pyrrolidone;
polyacrylamide;
copolymers comprising at least one of polyvinyl pyrrolidone or polyacrylamide; or
mixtures comprising at least one of polyvinyl pyrrolidone or polyacrylamide.

7. The aqueous battery electrolyte of claim 6, in which the acid-soluble and acid-stable polymer comprises a molecular weight of greater than 500,000 g/mol.

8. The aqueous battery electrolyte of claim 6, in which the acid-soluble and acid-stable polymer comprises a molecular weight of 500,000 g/mol to million g/mol.

9. The aqueous battery electrolyte of claim 6, in which the acid-soluble and acid-stable polymer further comprises polyarylate, polyacrylate, polymethacrylate, polyethylene oxide, copolymers including one or more of the foregoing, or mixtures of any of the foregoing.

10. The aqueous battery electrolyte of claim 6, further comprising up to 10 wt % phosphoric acid.

11. The aqueous battery electrolyte of claim 6, further comprising additives.

12. The aqueous battery electrolyte of claim 11, in which the additives comprise antimony suppression agents, additives for reducing water loss, deep discharge supporting agents, cycle life enhancers, or combinations thereof.

13. The aqueous battery electrolyte of claim 6, in which the acid-soluble and acid-stable polymer comprises 0.05 wt % to about 5 wt % of the aqueous battery electrolyte.

14. A battery comprising:
a positive electrode;
a negative electrode;
a battery separator; and
an aqueous electrolyte comprising:
aqueous sulfuric acid; and
an acid-soluble and acid-stable polymer comprising at least one of:
polyvinyl pyrrolidone;
polyacrylamide;
copolymers comprising at least one of polyvinyl pyrrolidone or polyacrylamide; or
mixtures comprising at least one of polyvinyl pyrrolidone or polyacrylamide.

15. The battery of claim 14, in which the battery separator comprises a microporous silica-filled polyethylene web, a phenol-resorcinol-formaldehyde web, microporous polyether sulfone web, a glass mat, an absorbent glass mat (AGM), or a combination thereof.

16. The battery of claim 14, in which the positive electrode and the negative electrode are dry-charge electrodes.

17. A method of making a battery, the method comprising introducing the aqueous battery electrolyte of claim 6 into an incomplete battery.

18. The method of claim 17, in which the aqueous electrolyte is introduced prior to electrode formation.

19. The method of claim 17, in which the aqueous electrolyte is introduced as replacement electrolyte after electrode formation.

20. The method of claim 17, in which the aqueous electrolyte is introduced into a dry charge battery.

* * * * *